United States Patent [19]

Bishop et al.

[11] 4,443,855

[45] Apr. 17, 1984

[54] METHOD OF AND APPARATUS FOR CONTROLLING ROBOTIC EQUIPMENT WITH THE AID OF MASK ALGORITHM IMAGE PROCESSING TECHNIQUES

[76] Inventors: Robert Bishop, 77 Pond Ave., Brookline, Mass. 02146; Richard Damon, 305 Memorial Dr., Cambridge, Mass. 02139

[21] Appl. No.: 260,892

[22] Filed: May 6, 1981

[51] Int. Cl.³ .......................... G06F 15/46; H04N 7/18
[52] U.S. Cl. .................................... 364/513; 358/107; 358/166; 382/54
[58] Field of Search .................. 364/513, 191–193, 364/514, 515, 516; 358/101, 107, 160, 166, 180, 284, 903; 382/8, 47, 54, 56

[56] References Cited

U.S. PATENT DOCUMENTS

| | | | |
|---|---|---|---|
| 3,986,007 | 10/1976 | Ruoff, Jr. ............................. | 364/513 |
| 4,017,721 | 4/1977 | Michaud ............................. | 364/513 |
| 4,146,924 | 3/1979 | Birk et al. ........................... | 364/513 |
| 4,187,051 | 2/1980 | Kirsch et al. .................... | 364/513 X |
| 4,305,130 | 12/1981 | Kelley et al. ........................ | 364/513 |
| 4,316,222 | 2/1982 | Subramaniam ................. | 364/515 X |
| 4,330,833 | 5/1982 | Pratt et al. .......................... | 364/515 |
| 4,334,241 | 6/1982 | Kashioka et al. ............... | 364/515 X |

Primary Examiner—Joseph F. Ruggiero
Attorney, Agent, or Firm—Rines and Rines, Shapiro and Shapiro

[57] ABSTRACT

A robotic control system and technique is disclosed involving image sensing of an object to be subjected to robotic action, to obtain analog image signals that are converted into binary image signal matrices which, through the use of a mask algorithm image processor (MAIP), are analyzed, and selected signals thereof corresponding to predetermined portions of the object defining points of interest at which robotic action is to be effected are fed to a computer to control movement of a robotic arm, tool or the like to effect some physical action at said predetermined points of interest of the object, in real time.

7 Claims, 13 Drawing Figures

METHOD OF AND APPARATUS FOR CONTROLLING ROBOTIC EQUIPMENT WITH THE AID OF MASK ALGORITHM IMAGE PROCESSING TECHNIQUES

The present invention relates to methods of and apparatus for controlling robotic mechanisms, being more particularly concerned with the real time image sensing of objects at predetermined locations of which the robotic mechanisms are to operate, and the development of mask algorithm processed signals that define the needed information for enabling computer control of the robotic mechanism to operate upon such predetermined locations in real time.

Prior techniques for enabling positional information and thereby controlling industrial robot devices are described, for example, in U.S. Pat. No. 4,146,924 to Birk et al. There are growing applications, however, that require very fast image-sensing iteration for production-line processing and that can benefit from limiting the image data to predetermined regions or portions of the image field only associated with areas where robotic action is to be effected. The location of desired image portions can be obtained by mask algorithm image processing (MAIP) of the type described, for example, by Maskazu et al. in "A Process for Detecting Defects in Complicated Patterns", Computer Graphics and Image Processing, 1973, Vol. 2, pp. 326–39, and by related image pre-processing techniques as described by Nudd et al. in "Charge-Coupled Device Technology For Smart Sensors", Image Understanding Workshop, May 1978, Science Applications, Inc.

As later discussed, prior use of mask algorithms implemented in large computer software for such selected image portion enhancements is inherently too slow for growing requirements of real-time high speed operation. Such requirements are an important aspect of industrial robots and the like, requiring high-speed information with respect to location and relative orientation of portions, parts or pieces of objects to be acted upon by or through a robotic arm or tool, and with precision and in real time.

Accordingly, it is an object of the present invention to provide a new and improved method of and apparatus for controlling robotic equipment with the aid of mask algorithm image processing techniques and that are not subject to the above-described and other limitations, but that, to the contrary, enable high-speed real-time operation and with improved precision.

A further object is to provide an improved robotic mechanism with an enhanced real-time detection and analysis system for locating those portions, points or parts of objects at which manipulation or other robotic action is to be effected.

Another object is to provide a detector and a computer-controlled robotic mechanism in which the analysis system provides real-time information for control of the robotic arm, tool or the like.

Still another object is to provide a mechanism with enhanced capability in detection and analysis for determining location and/or orientation of the portions, points, parts of objects or pieces.

A further object is to provide an improved apparatus adapted to identify critical boundaries and corners of the portions, points, parts of the objects or pieces.

Other and further objects will be explained hereinafter and are more particularly delineated in the appended claims.

The foregoing objects are achieved, generally, in a system to locate an object in a field, which system includes an image sensor operable to scan the field and provide an analog image of objects within the field and further includes a mechanism to convert the analog image to a binary image in the form of binary words each comprising several bits, said bits forming multiple adjacent rows and being used to implement a mask algorithm image processor. The system includes a high-speed picture memory connected to receive the binary words and operable to store the same in a manner that maintains the spatial relationship thereof, and an analyzer to study in successive iterations of the stored binary image, contiguous over-lapping groups of bits. Each group comprises at least four bits in a two-by-two matrix to determine the new binary value to be assigned to one bit of the group (often an interior bit), which new binary value is applied to said bit to update the same. The analyzer has a programmable memory or combinational logic operable to assign in real time the new binary value to the bit, which new value is applied as an update only after the present value of the bit has been retained for any further computations in the current iteration. A result memory receives and stores information from the analyzer only as to portions or points of interest in the field, the information being in the form of address information and description information concerning the points of interest. The system disclosed includes the foregoing in the context of an industrial robot or the like which is computer controlled; the result memory serving to compress the data transmitted to the computer and hence, among other things, reducing, simplifying and facilitating analysis.

In summary, from one of its broad aspects, the invention embraces a method of controlling robotic equipment, that comprises, image-sensing an object to produce analog image signals; converting the analog image signals into corresponding binary image signal matrices; contracting and expanding portions of said binary image signal matrices in accordance with predetermined stored binary matrix mask algorithms to analyze predetermined portions of interest of the object; storing in memory, address and description information as to said predetermined portions of interest; applying the stored information to a computer; and controlling robotic apparatus by the computer to cause robotic operation at said portions of interest of the object in real time. Preferred apparatus and best mode embodiments are hereinafter set forth.

The invention is described hereinafter with reference to the accompanying drawing in which.

Figure 1A:
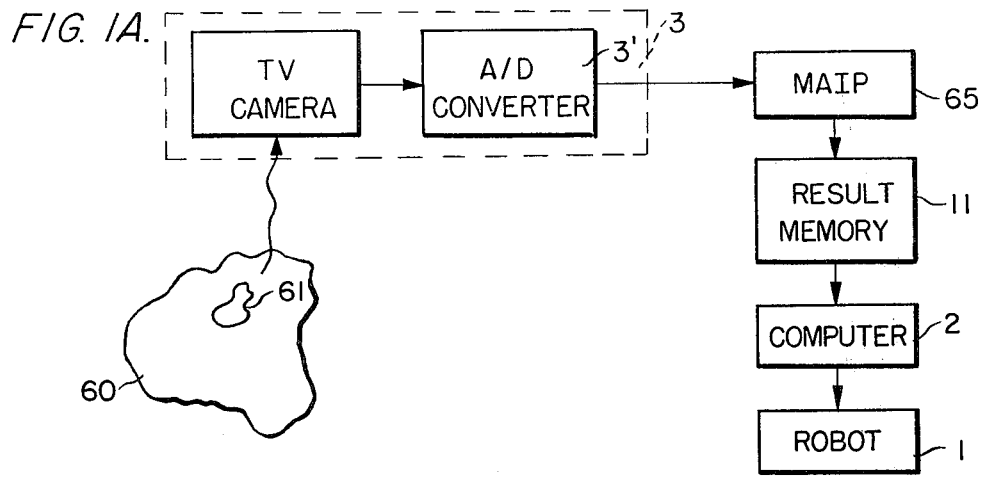
FIG. 1A is a generalized block diagram representation of a preferred apparatus for effecting real-time robotic control with the aid of MAIP type image processing in accordance with the method underlying the invention.

Basic elements of the computer-controlled robotic mechanism, system or apparatus are shown in FIG. 1A, comprising a television camera image sensor 3 provided with analog-to-digital signal conversion at 3' for applying binary word signals to the preferred mask algorithm image processor (MAIP) 65. This processor selects the important information for locating the regions of an object at which robotic action is to be performed and applies the same to a result memory 11 for application to the computer 2 that controls the robot device 1.

Figure 1B:
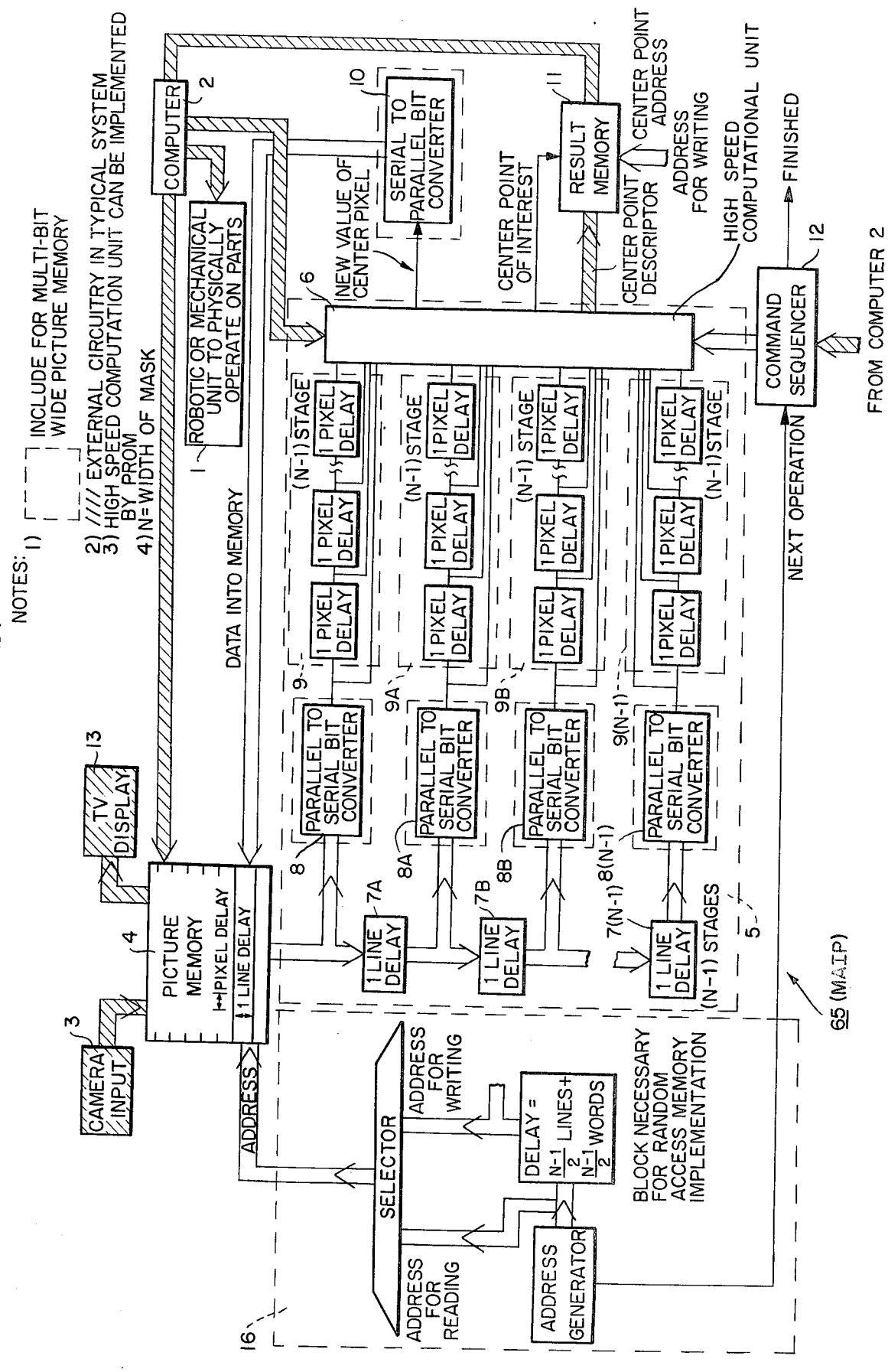
FIG. 1B is a more detailed diagrammatic representation of the robotic mechanism or equipment that includes its computer control on the basis of real-time information from the image processor and with high speed computation.

Turning now to FIG. 1B, the computer-controlled robotic mechanism or apparatus is shown provided with a robotic (or other mechanical) unit 1 for performing some physical operation on a piece or on a portion or part of an object. The piece or part may be, for example, a mechanical object 61, as schematically represented in FIG. 1A, which may be disposed in some random orientation in a field or work area 60. The function of the robot 1 may be to locate the object in the field or work area, to pick it up and move it to some predetermined location or it may be to perform some other physical action on the object or some portion(s) thereof. Actual control of the robotic unit 1 is through the computer 2, with the real-time locating of the object or portion thereof and determination of orientation being accomplished by the further apparatus in FIG. 1B, as now explained.

The before-mentioned television camera or other image sensor 3 may be attached to a cantilever structure or the like, as described in the before-mentioned Birk et al. patent, to permit x-y-z movement thereof over the field of interest and in this way to establish the coordinates of the camera position once the object is located. Thereafter, the location of the object and its orientation or desired portion thereof are established by the further circuit elements in FIG. 1B. The television camera 3 provides analog image signals which are converted to binary image signals in the form of binary words, each being composed of one or more picture elements or pixels in a row. Typically, in an industrial television camera, there may be 256×256 or more pixels (though frequently 512×512 or 1024×1024 pixels are employed) that form an image; that is, there are 256 rows of pixels and 256 columns, providing 65,536 pixels for each complete scan of the camera 3.

The binary-word output of the camera or other image sensor 3 is fed to a high-speed picture memory 4 that receives the binary words and stores the same in a manner that maintains the spatial relationship thereof, as is well known. An analyzer 5 serves to study in successive iterations of the stored image signals, contiguous overlapping groups of the binary digits that represent the discrete pixels; each group consisting of an N-by-N matrix, Each group studied consists of at least four binary digits; i.e., a two-by-two matrix (N=2). However, groups of nine elements forming a three-by-three matrix (i.e., N=3) are more frequently incorporated. Such groups, called masks, are analyzed in a high-speed computational unit 6, as of the types described in the before mentioned publications.

The analyzer 5 is operable to analyze data on the basis of an N-by-N grouping. It includes (N−1) one-line delays 7A, 7B ... 7(N−1) (buffers or line-storage memory means), whose respective outputs are fed to respective parallel-to-serial-bit converters (shift registers, for example), 8A, 8B ... 8(N−1). A further converter 8 derives its input, without delay, directly from the memory 4. The output of the converter 8 is connected to an array of one-pixel delays 9. The outputs of the respective converters 8A, 8B ... 8(N−1) are connected to respective arrays of one-pixel delays 9A, 9B ... 9(N−1), the outputs of which, plus the output of the array 9, are connected as input to the computational unit 6. The computational unit 6 may be of a standard combinatorial circuitry type; i.e., gates, a programmable read only memory—PROM—or a random access memory—RAM—that can initially be programmed by the computer for different mask operations. Alternatively, the block 6 can contain both a PROM and a RAM. It will be appreciated that the data passing through the arrays 9 ... 9(N−1) is in the form of binary digits such that a one-pixel delay is, in fact, a one-digit delay, wherein each digit represents the information in one pixel. As is noted above, typically, analysis may be made in groups of three-by-three pixels; that is, N=3. With three-by-three grouping, the analyzer 5 in FIG. 1B would have only the one-line delays 7A and 7B, the converters 8 and 8B, and the array of one-pixel delays 9, 9A and 9B.

Figure 2A:
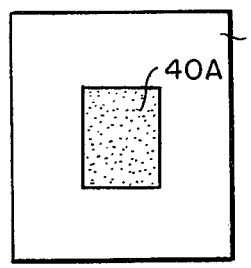
FIG. 2A shows an object upon predetermined portions or parts of which robotic action is to be performed, displayed on the screen of a television monitor.

In the following explanation, three-by-three groups are used as exemplary, with reference to the illustrative example of FIGS. 2A–2D, 3A–3F and 4. Let it be considered that 40 in FIG. 2A represents the image screen of a camera and that 40A is the analog image of a dark object of interest, such as an object on predetermined portions of which robotic action is to be effected. The analog image 40A, after conversion to digital form, is illustrated at 41 in FIG. 2B as a five-by-five array of 1's in a sea of 0's. In this example of FIG. 2A, there are ten-by-ten pixels that form ten-by-ten binary digits in FIG. 2B, the 1's representing a dark image and the 0's representing a light image.

Figure 2B:
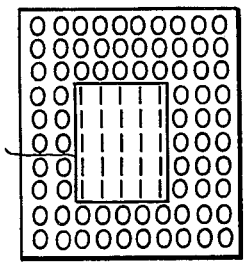
FIGS. 2B, 2C and 2D show, respectively, an illustrative binary digital representation of the object in FIG. 2A, a binary digital representation of the border of the object represented in FIG. 2B with all the internal digits inverted, and a two-iteration decrease in size of the representation in FIG. 2B.
Figure 2C:
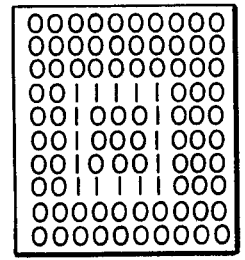
Figure 3A:
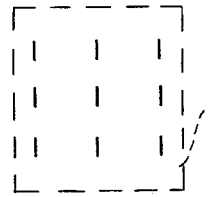
FIGS. 3A–3F represent exemplary three-by-three digital masks employed in the image processor of FIG. 1.
Figure 3B:
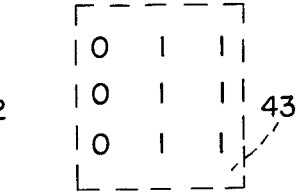
Figure 3C:
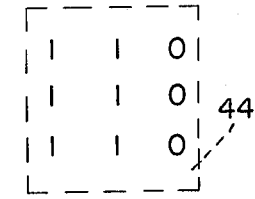
Figure 3D:
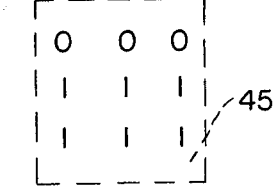
Figure 3E:
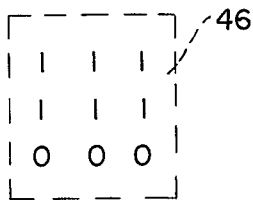
Figure 3F:
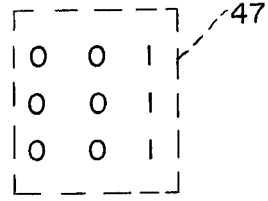

Change of the binary configurations of FIG. 2B to that of FIG. 2C can be accomplished by use of a digital mask 42, FIG. 3A, pre-programmed into the computational unit 6. The mask 42 is a three-by-three mask that eliminates all pixels (i.e., all binary digits representative of pixels) not in the perimeter of the rectangle 41 in FIG. 2B. The mask 42 yields a new value of the center digit (interior element) of a three-by-three matrix as a function of its present value (i.e., 1 or 0) and the value of all contiguous digits about the center digit. Each time the pattern of the mask 42 is located, the output of computational unit 6, FIG. 1B, indicates that the value of the center digit or element must be changed. In this example, the change is to a logical 0 in the successive image of FIG. 2C. It is important to emphasize that prior to updating the value of a pixel in the memory 4, its present value is retained until no longer required in the present iteration. This can perhaps better be appreciated on the basis of the following explanation with reference to FIG. 4.

Figure 4:
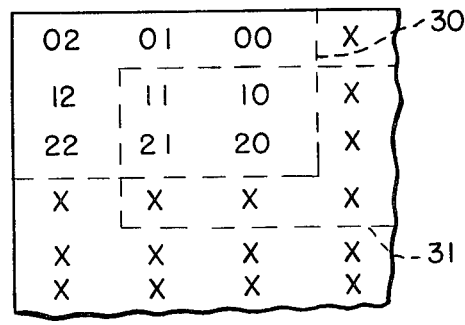
FIG. 4 shows a three-by-three matrix to facilitate explanation of an expansion-contraction process in the MAIP image precessor of FIG. 1.

Two three-by-three matrices 30 and 31 are considered in FIG. 4. As illustrated, to calculate the successive value for the pixel "11" of FIG. 4, values for pixels "00", "01", "02", "10", "11", "12", "20", "21", and "22" are required. To calculate the successive value for the pixel "20", however, the present value of the pixel "11" is required. Hence, the present value of the pixel "11" must be retained until the next value for the pixel "20" has been calculated. The process performed is thus to convert the digital data represented by FIG. 2B to that represented by FIG. 2C.

Figure 2D:
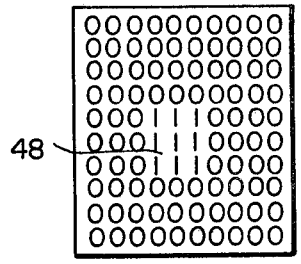

The alteration of data from that of FIG. 2B to that of FIG. 2D is effected by processing in the computational unit 6, using the digital masks 43 to 46 in respective FIGS. 3B to 3E, also pre-programmed in the unit 6, that respectively permit edge detection of the left edge, the right edge, the top edge and the bottom edge of the pattern 41 in FIG. 2B. The masks 43 to 46 serve to reduce or contract the size of the digital image 41 in FIG. 2B to the size of the digital image shown at 48 in FIG. 2D. It will be appreciated that one more reduction or contraction iteration will result in there being a single "1" at the center of the digital image 48. Enlargement or expansion of the image 48 to the size of the image 41 can be achieved by using four masks like the mask 47 in FIG. 3F, the mask 47 serving to enlarge the image 48 at its left edge only. This technique of contraction and expansion is employed in this mask algorithm image processor (MAIP) generally indicated by the reference numeral at 65 in FIGS. 1A and 1B as a mechanism for identification of only objects or portions thereof of interest in the field. The MAIP 65 includes the high-speed picture memory 4 and the analyzer 5, and employs the hereinafter described result memory 11, converter 10, address memory 16, if needed.

The compression and expansion mechanism, as noted above, is used as a mechanism to identify predetermined objects or portions thereof of interest in a field or work area. Once such an object or portion(s) of interest is thus identified, its coordinates are stored in the result memory 11, FIG. 1B, which stores address information and description information only for points of interest. The importance of the result memory 11 can be better appreciated on the basis of the explanation below.

For the robotic mechanism to operate on any object or predetermined portion(s) thereof, it is necessary to know exactly where the object or portion is located. In many systems, the entire process picture of a typical television camera (256×256 pixel elements or more) must be examined to locate the picture element(s) of interest. In the present device, the added result memory 11 stores only the picture element(s) of interest, thereby eliminating the need to analyze undesired picture elements. This results in great simplification and savings in processing. Thus, for example, should the image contain a rectangular object 20×20 elements, the result memory 11 would simply store geometrical information [i.e., point part of left, right, bottom, or top edge of object, and spatial position of point in the field—memory address of point] of the eighty parameter binary digit elements; and only information concerning these eighty elements would be transferred to the computer 2, rather than information concerning all 65,536 (or more) elements, which would be the case in the absence of the result memory 11.

The address block 16 in FIG. 1B serves to generate addresses for reading and writing data from the memory 4 and writing point position information into the result memory 11.

Connections between the computational unit 6 and the result memory 11 thus contain bits providing information about the geometrical relationship between the interior element (e.g., the pixel "11") and its neighbors, and a bit to indicate that this geometrical information and the memory address (from the address memory 16) for the interior element is to be stored in the result memory. A command sequence 12 is initially programmed by the computer 2 with the desired sequence of mask operations to be performed by the unit 6 on the image stored in the memory 4. The address memory 16 generates the necessary addresses for reading the present pixel value and writing the new value back into the memory 4 and the result memory 11.

The robotic system may also contain a television display 13 to permit visual monitoring. The system permits real-time high-speed operation (for example, less than about twelve milliseconds for each image iteration, i.e., 256×256 pixels) which is to be compared with prior mask algorithms implemented in software on large computers wherein data processing times range from seconds to minutes, and which renders the large computers unsuitable for such high-speed industrial operations as the automated handling, assembly and inspection-like processing of electronic circuit boards, integrated circuits and integrated wafers; mechanical mechanisms assembled from prefabricated parts; packaging of consumer products; and so forth. For these and other types of operation in which high speed production-line processing times are required (i.e., 12 microseconds/iteration or so) the software approach is entirely unsatisfactory.

By way of further illustration, the present system can be used to permit automatic bonding of conductors to pads in integrated circuit chips. Present techniques provide apparatus that automatically feeds an integrated circuit chip and its package to a work station; but the exact positioning there is done manually. The chip at the work station is situated on a movable mechanical stage beneath a bonder. A human operator carefully moves the stage while viewing the chip on a television monitor and records all corresponding bonding pad-package lead coordinate pairs into a computer. The operator then signals the bonder (through the computer) automatically to connect all the indicated coordinates. Since the position of the chip relative to the package varies slightly for each device, bonding pad coordinates, or relative chip offsets, must be recalculated for each chip. In this illustration, one could imagine automatically locating the coordinates of the pads on a chip or relative chip offsets by feeding the output of a television camera into a computer that implements a mask algorithm locating operation in software and then passes the calculated parameters to the computer to control stage position. However, prior to the present invention, human operators could perform these pattern recognition operations much faster than such software operations. It is the problem of economic fast response, real-time location in production-line systems and the like that the present invention is directed.

A few comments of a general nature are now in order. The optical sensor discussed previously is a television camera whose image screen is divided in a time frame, typically 256×256, with a threshold detector to convert an analog signal to a binary signal. But the sensor can also be any one of a number of recently developed optical sensing devices distributed in an array, such as solid state charged coupled image sensors, laser scanners, or thermal imaging devices, that are adapted to provide binary digital signals as output in the form of binary digital words which can then be processed in the manner above discussed. The devices themselves can also be binary in nature in that they are on only at some threshold level of input light.

Further modifications of the invention herein disclosed will also occur to persons skilled in the art and all such modifications are deemed to be within the scope of the invention as defined in the appended claims.

What is claimed is:

1. Robotic apparatus having, in combination, a robotic mechanism to operate on points of interest in a field; computer means for controlling the robotic mechanism; an image sensor operable to scan the field and provide an analog image of objects within the field; means to convert the analog image to a binary image in the form of binary words each comprising several pixels, said pixels forming multiple adjacent rows; and a mask algorithm image processor that comprises high-speed picture memory means connected to receive the binary words and operable to store the same in a manner that maintains the spatial relationship thereof, and analyzing means for analyzing contiguous overlapping groups of binary bits in successive iterations of the stored binary image, each group comprising at least nine pixels in a three-by-three matrix, thereby to determine the new binary value to be assigned to the center pixel of the group, which new binary value is applied to said center pixel to update the same, said analyzing means including a programmable memory operable to store in real time the present binary value to the center pixel until it is no longer needed in the present iteration and also to apply the new value as memory update in real time; and result memory means that receives information from the analyzing means only as to said points of interest and that stores said information which is in the form of address information and description information with respect to said points of interest to provide an output that is connected as input to the computer in order to cause the robotic mechanism to operate upon said points of interest of objects in real time.

2. Apparatus as claimed in claim 1 in which the programmable memory comprises a programmable read only memory.

3. Apparatus as claimed in claim 1 in which the programmable memory comprises a random access memory.

4. For use in an apparatus to locate points of interest in a field, which apparatus includes an image sensor operable to scan the field and provide an analog image of objects within the field and which further includes a mechanism to convert the analog image to a binary image in the form of binary words each comprising several pixels, said pixels forming multiple adjacent rows, a mask algorithm image processor that comprises high-speed picture memory means connected to receive the binary words and operable to store the same in a manner that maintains the spatial relationship thereof; analyzing means for analyzing contiguous overlapping groups of pixels in successive iterations of the stored binary image, each group comprising at least nine pixels in a three-by-three matrix to determine the new binary value to be assigned to the center pixel of the group, which new binary value is later applied to said center pixel to update the same, said analyzing means including a programmable read only memory (PROM) operable to assign in real time the new binary value to the center pixel, which new value is applied as an update only after the address coordinate of the center pixel is no longer needed in the current iteration; and result memory means connected to receive information from the analyzing means with respect to said points of interest and operable to store the information, said information being in the form of address information and description information as to said points of interest.

5. Apparatus as claimed in claim 4 wherein the analyzing means includes buffer or line-storage memory means connected to receive data from the high speed picture memory means as input and operable to provide an output, and shift registers connected to receive as input the output of the buffer or line-storage memory means and provide an output that is connected as input to the PROM which, in turn, is connected to control data processing in the high-speed picture memory means.

6. For use in a system to locate at least one point of interest in a field, which system includes an image sensor operable to scan the field and provide a binary image in the form of binary words, a mask algorithm image processor that comprises high-speed memory means connected to receive the binary words and operable to store the same in a manner that maintains the spatial relationship thereof;

analyzing means for analyzing contiguous overlapping groups of binary bits in successive iterations of the stored binary image, each group comprising at least nine digital bits in a three-by-three matrix to determine the new binary value to be assigned to an interior bit of the group, which new binary value is applied to said interior bit to update the same, said analyzing means including circuitry operable to store in real time the present binary value of the interior bit until no longer required in the present iteration and also to apply the new value memory update in real time; and result memory means connected to receive information from the analyzing means with respect to said at least one point of interest and operable to store the information, said information being in the form of address information and description information with respect to said at least one point of interest.

7. For use in a system to locate at least one point of interest in a field, which system includes image sensor means operable to scan the field and provide a binary image in the form of binary words, a mask algorithm image processor that comprises high-speed memory means connected to receive the binary words and operable to store the same in a manner that maintains the spatial relationship thereof;

analyzing means for analyzing contiguous overlapping groups of binary bits in successive iterations of the stored binary image, each group comprising tne new binary value to be assigned to a bit of the group, which new binary value is applied to said bit to update the same, said analyzing means including circuitry operable to store in real time the present binary value to said bit until no longer needed ln the present iteration and also to apply the new value as a memory update in real time; and result memory means connected to receive information from the analyzing means with respect to said at least one point of interest and operable to store the information, said information being in the form of address information and description information with respect to said at least one point of interest.

* * * * *